US012585018B2

(12) United States Patent
Mlinar

(10) Patent No.: US 12,585,018 B2
(45) Date of Patent: Mar. 24, 2026

(54) TIME-OF-FLIGHT SENSING SYSTEM

(71) Applicant: SEMICONDUCTOR COMPONENTS INDUSTRIES, LLC, Phoenix, AZ (US)

(72) Inventor: Marko Mlinar, Horjul (SI)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 1075 days.

(21) Appl. No.: 17/651,140

(22) Filed: Feb. 15, 2022

(65) Prior Publication Data

US 2023/0314615 A1 Oct. 5, 2023

(51) Int. Cl.
*G01S 17/89* (2020.01)
*G01S 7/4863* (2020.01)
*G01S 7/4914* (2020.01)

(52) U.S. Cl.
CPC ............ *G01S 17/89* (2013.01); *G01S 7/4863* (2013.01); *G01S 7/4914* (2013.01)

(58) Field of Classification Search
CPC ........ G01S 17/89; G01S 17/894; G01S 7/493; G01S 17/36; G01S 7/4914; G01S 7/4863; G01S 17/931
See application file for complete search history.

(56) References Cited

U.S. PATENT DOCUMENTS

| | | | | |
|---|---|---|---|---|
| 10,613,228 | B2 * | 4/2020 | Fenton | ............... G01S 17/10 |
| 11,734,801 | B2 * | 8/2023 | Ortiz Egea | ............ G06T 7/80 |
| | | | | 382/106 |

| | | | |
|---|---|---|---|
| 2015/0138366 | A1 | 5/2015 | Keelan et al. |
| 2016/0003937 | A1 | 1/2016 | Metz et al. |
| 2016/0239725 | A1 | 8/2016 | Liu et al. |
| 2017/0154413 | A1 | 6/2017 | Yu et al. |

FOREIGN PATENT DOCUMENTS

| | | |
|---|---|---|
| EP | 2939049 B1 | 2/2018 |

OTHER PUBLICATIONS

Lawin et al. "Efficient Multi-Frequency Phase Unwrapping using Kernel Density Estimation." Aug. 18, 2016.
Bolsee et al. "Cnn-based Denoising of Time-Of-Flight Depth Images," 2018 25th IEEE International Conference on Image Processing (ICIP), 2018, pp. 510-514.

* cited by examiner

*Primary Examiner* — An H Do
(74) *Attorney, Agent, or Firm* — Slayden Grubert Beard PLLC

(57) ABSTRACT

A time-of-flight (TOF) sensing system may include an illumination module and a sensor module. The sensor module may include an array of sensor pixels, each sensor pixel configured to perform multiple measurements to generate corresponding pixel data for a TOF sensing operation. Signal processing circuitry may generate phase data based on the pixel data. Phase denoise circuitry in the signal processing circuitry may perform different types of filtering operations on the phase data such as perform two bilateral filters of varying strengths. The lower-fidelity denoised phase data may be used for depth disambiguation, while the higher-fidelity denoised phase data may be used for depth calculation. If desired, the phase denoise circuitry may perform averaging operations for one or both of these filtering operations using a Cartesian coordinate representation and efficiently using piecewise linear trigonometric approximations.

20 Claims, 6 Drawing Sheets

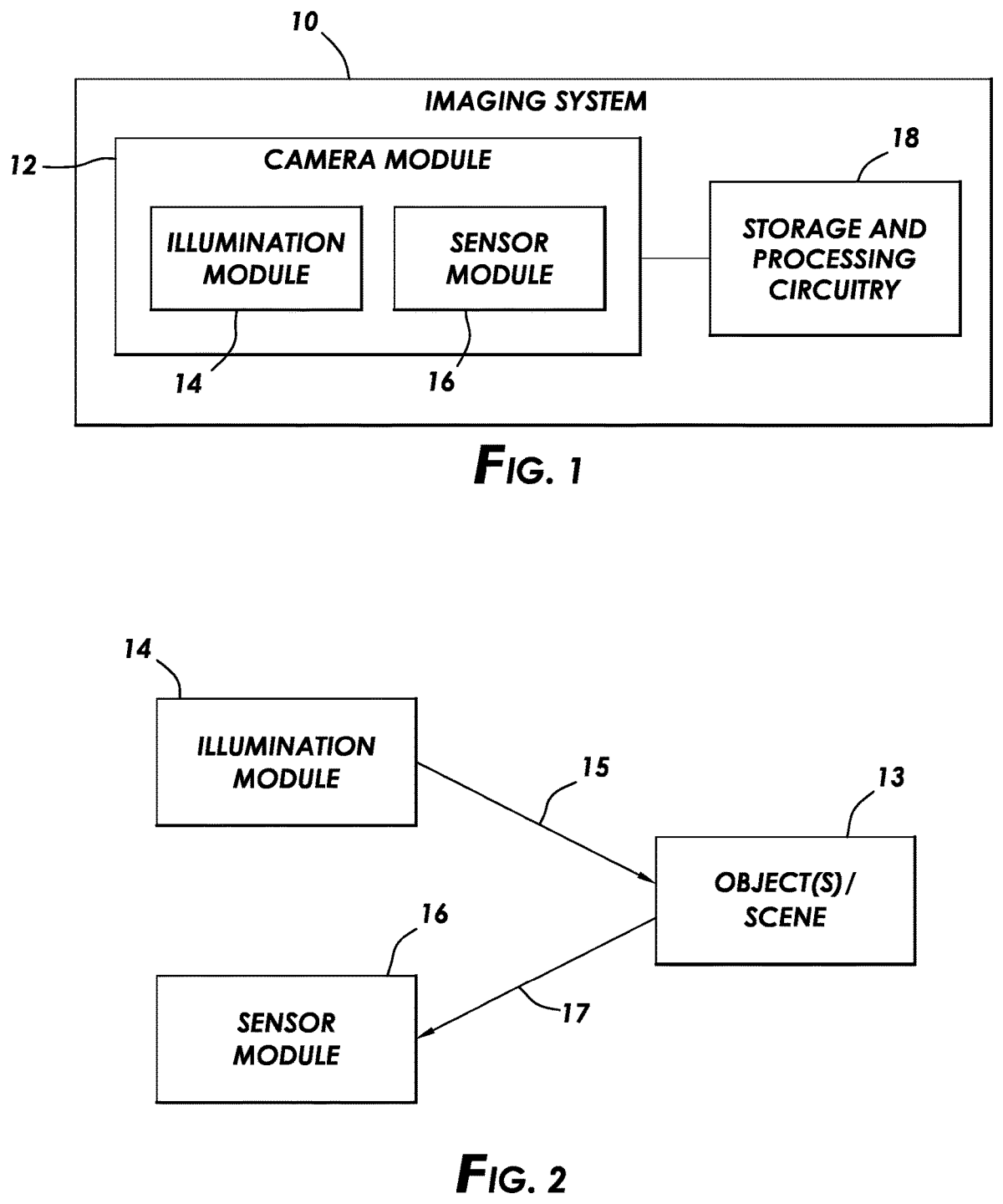

*10*

IMAGING SYSTEM

*12*

CAMERA MODULE

ILLUMINATION MODULE

SENSOR MODULE

*14*     *16*

*18*

STORAGE AND PROCESSING CIRCUITRY

ILLUMINATION MODULE

*15*

*13*

OBJECT(S)/ SCENE

*16*

SENSOR MODULE

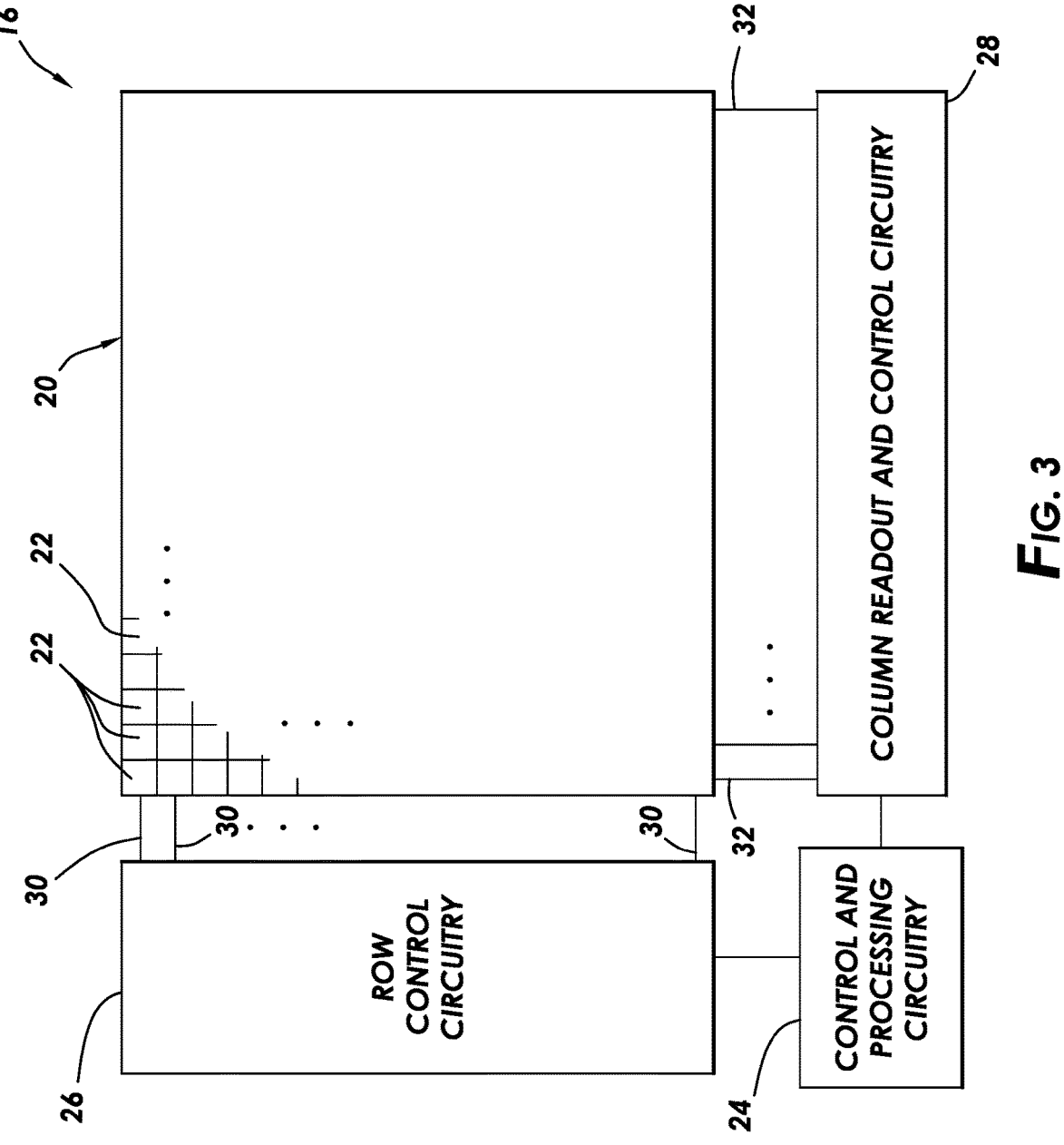
*F*IG. 3

$$W_{small} = \begin{bmatrix} 1 & 2 & 1 \\ 2 & 4 & 2 \\ 1 & 2 & 1 \end{bmatrix}$$

$$W_{large} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

$$W_{wide} = \begin{bmatrix} 3 & 3 & 3 & 3 & 3 \\ 1 & 1 & 1 & 1 & 1 \\ 1 & 1 & 1 & 1 & 1 \end{bmatrix}$$

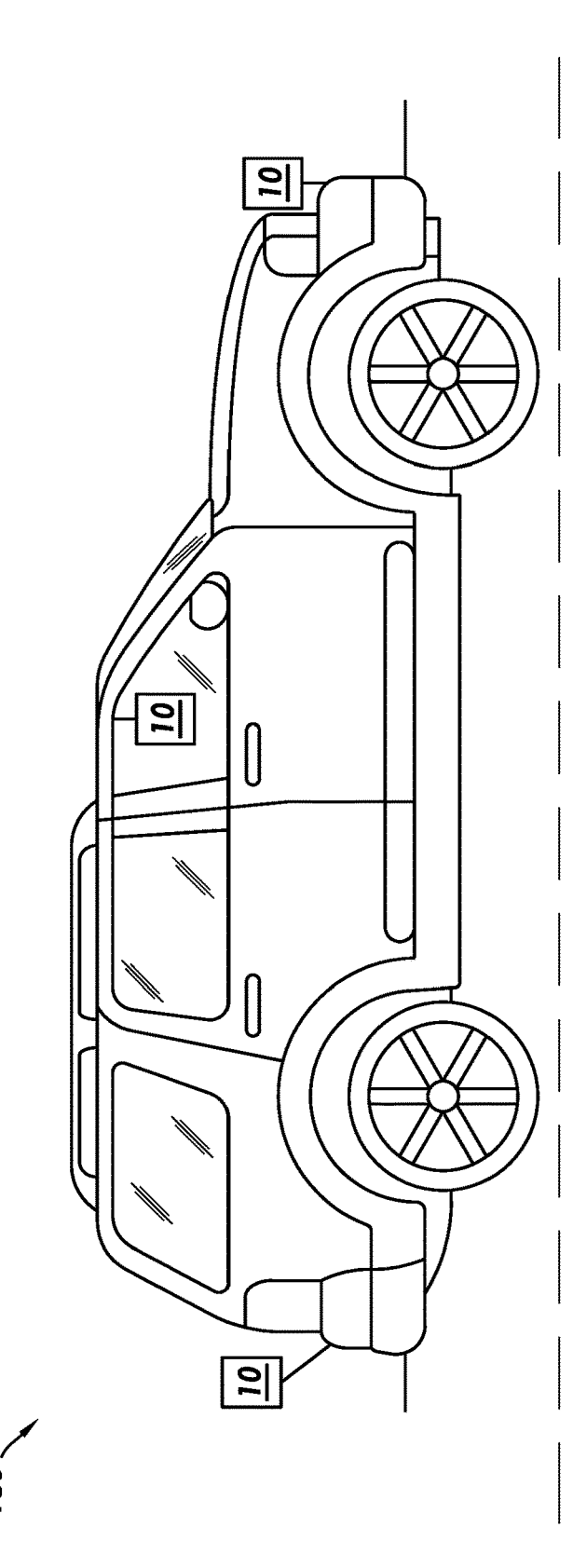
*FIG. 8*

TIME-OF-FLIGHT SENSING SYSTEM

BACKGROUND

This relates generally to imaging systems and more specifically to cameras having time-of-flight (TOF) sensing capabilities.

A typical TOF sensor includes an illumination module and a sensor module. The illumination module emits light onto an image scene having one or more objects. The emitted light reflects off of the one or more objects and is received by pixels in the sensor module to generate corresponding electrical charge. Based on the received light (e.g., the generated electrical charge), the sensor module can perform time-of-flight sensing calculations or operations to determine depth and other scene information. In some illustrative applications, it may be desirable for the sensor module to detect ambient light while the illumination module is turned off such that ambient light data can be gathered without gathering reflected light data.

In the illustrative example of indirect TOF sensing (where depth is not directly measured), the sensor module often takes measurements indicative of phase data in order to perform depth disambiguation and depth determination. The phase data is generally filtered (denoised) prior to the depth disambiguation and determination operations.

However, the phase data denoise operation can be complex and needs to balance different considerations for optimizing both depth disambiguation and depth determination.

It is within this context that the embodiments herein arise.

BRIEF DESCRIPTION OF THE DRAWINGS

FIG. 1 is a block diagram of an illustrative imaging system having a time-of-flight sensor in accordance with some embodiments.

FIG. 2 is a block diagram of light emitted from an illumination module and light reflected from one or more objects that is collected by a sensor module in accordance with some embodiments.

FIG. 3 is a block diagram of illustrative sensor circuitry having a pixel array and corresponding control, readout, and processing circuitry in accordance with some embodiments.

FIG. 8 is a diagram of an illustrative vehicle having one or more imaging or time-of-flight sensing systems in accordance to some embodiments.

DETAILED DESCRIPTION

Figures 4, 5A, 5B, 5C:
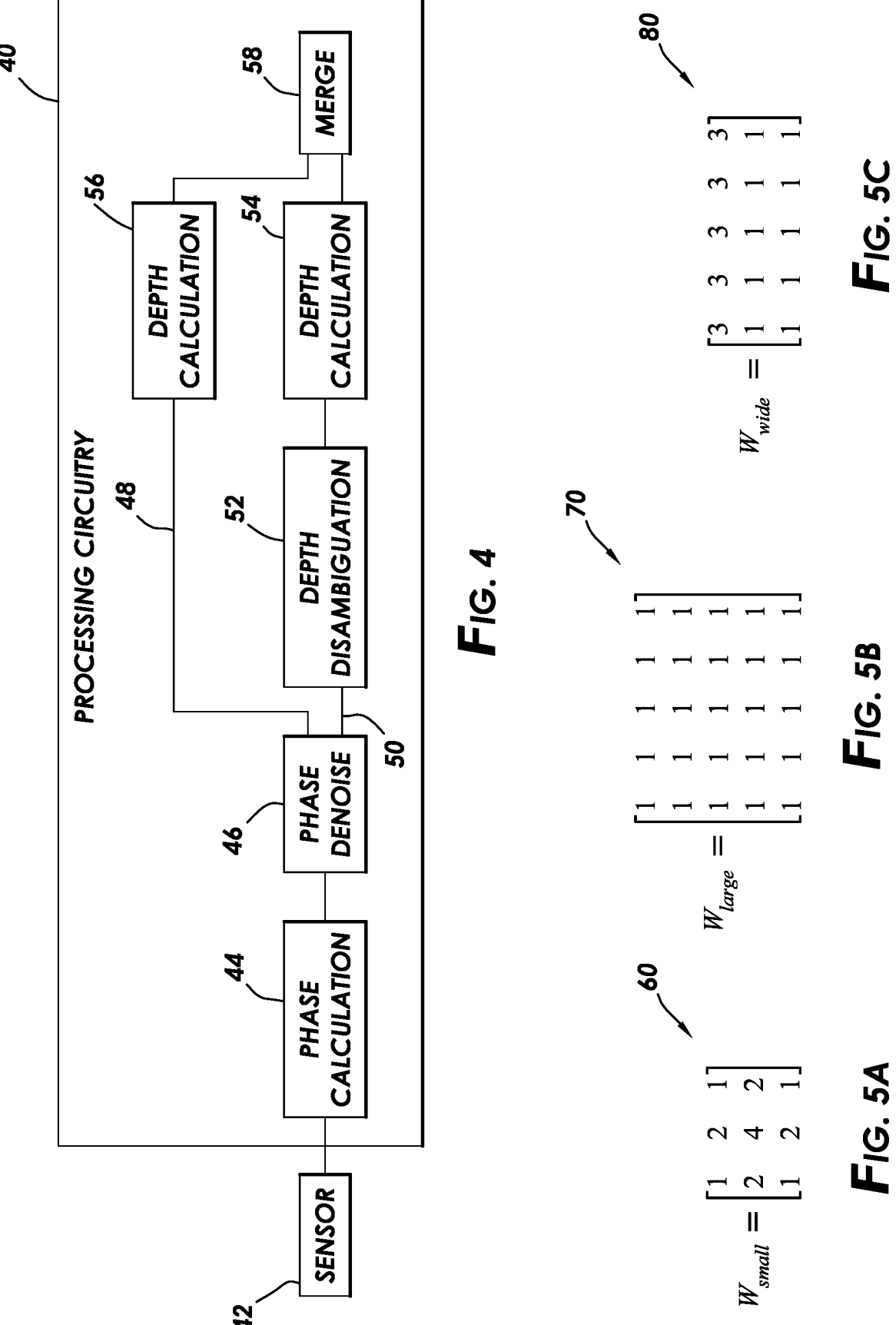
FIG. 4 is a block diagram of illustrative signal processing circuitry blocks for performing time-of-flight sensing in accordance with some embodiments.
FIGS. 5A-5C are diagrams of three illustrative sets of weights for performing bilateral filtering in accordance with some embodiments.

Electronic systems such as digital cameras, computers, cellular telephones, automotive systems, and other electronic systems may include imaging systems or modules that gather light (photons) to capture one or more images (one or more image frames) that include information about their surrounding environments (e.g., the image scenes). The imaging system may have sensor circuitry including one or more arrays of image sensor pixels (sometimes referred to herein as sensor pixels or pixels). The active pixels in the array may include photosensitive elements such as pinned photodiodes that convert the incoming light into electric charge. The array may have any number of pixels (e.g., hundreds or thousands or more). Sensor circuitry may include control circuitry such as circuitry for controlling the pixels and readout circuitry for reading out image signals corresponding to the electric charge generated by the photosensitive elements.

FIG. 1 is a diagram of an illustrative imaging system such as an electronic device that uses sensor circuitry (sometimes referred to herein as a sensor module) to capture images. Imaging system 10 of FIG. 1 may be a stand-alone camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures image data. Camera module 12 (sometimes referred to as an imaging module) may be used to convert incoming light into digital image data. Camera module 12 may include one or more corresponding sensor modules 16 (sometimes referred to as image sensor modules or image sensors). During image capture operations, light from a scene may be focused onto sensor module 16 by one or more corresponding lenses. Sensor module 16 may include circuitry for generating analog pixel image signals and circuitry for converting analog pixel image signals into corresponding digital image data, as examples. The digital image data may be provided to storage and processing circuitry 18.

Storage and processing circuitry 18 may include one or more integrated circuits (e.g., digital signal processing circuits, image processing circuits, microprocessors, storage devices such as random-access memory and non-volatile memory, etc.) and may be implemented using components that are separate from camera module 12 and/or that form part of camera module 12. When storage and processing circuitry 18 is implemented on different integrated circuits than those implementing camera module 12, the integrated circuits with circuitry 18 may be vertically stacked or packaged with the integrated circuits for camera module 12. Image data that has been captured by camera module 12 may be processed and stored using processing circuitry 18 (e.g., using an image processing engine on processing circuitry 18, using a digital signal processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Camera module 12 may implement a time-of-flight (TOF) sensor or camera. In these configurations, camera module 12 may include illumination module 14 configured to emit light for illuminating an image scene (e.g., one or more objects in the image scene), and sensor module 16 may be configured to gather reflected versions of the emitted light and to generate TOF information for the image scene (e.g., depth or distance information for one or more of the objects, a depth or distance map of the image scene, an image of the image scene, other information indicative of TOF information, etc.).

FIG. 2 is an illustrative diagram showing how illumination module 14 may emit light and how sensor module 16 may receive the corresponding reflected light (e.g., the emitted light after reflecting off of one or more objects). As shown in FIG. 2, illumination module 14 may include one or more light emitters (sometimes referred to herein as one or more light sources or one or more illumination sources) coupled to driver circuitry and/or controller circuitry for controlling and driving the one or more light emitters. The light emitters may be implemented using and may include one or more light emitting diodes (LEDs), one or more laser diodes, one or more lasers, and/or one or more of other suitable light or illumination sources. The light emitters may emit light of any suitable wavelength (e.g., visible light, infrared light, etc.).

Illumination module 14 (e.g., a light emitter controlled by the driver circuitry) may emit light 15 having any suitable characteristics (e.g., any suitable waveform, any suitable peak amplitude or power, any suitable periodicity or frequency, pulses of light, light with a modulated amplitude and a modulation frequency, etc.). Light 15 may reach one or more objects 13 in an image scene and reflect off one or more objects 13 as reflected light 17. Objects 13 may include any suitable objects, inanimate or animate, at different depths in the scene.

Reflected light 17 may be received at sensor module 16 (e.g., at one or more active image pixels in sensor module 16, at one or more photosensitive elements in the active image pixels, etc.). Driver circuitry and/or control circuitry may control the pixels in sensor module 16 to generate one or more image frames based on reflected light 17 (e.g., by providing control signals coupled to transistors or other actuated elements in the pixels). In particular, based on the received control signals from the driver circuitry and/or control circuitry, the pixels may generate different portions of charge in response to reflected light 17 (e.g., during an integration or exposure time period), may perform readout operations on the generated portions of charge (e.g., during a readout time period), and may perform other suitable operations during other time periods.

In configurations where illumination module 14 and sensor module 16 operate in an indirect TOF sensing scheme, processing circuitry for the TOF sensor (e.g., coupled to sensor module 16) may use a phase difference between emitted light signal 15 and reflected light signal 17 (collected by sensor module 16) to determine (e.g., calculate) TOF information for the scene during a TOF sensing operation. In particular, the TOF sensor (e.g., control circuitry in camera module 12 or imaging system 10) may control illumination module 14 and control the characteristics of emitted light signal 15 (e.g., to have a suitable modulation frequency, a suitable relative phase, a suitable amplitude, a suitable waveform, etc.), and may also control sensor module 16 based on a sensor (de) modulation signal (e.g., having a suitable de (modulation) frequency matching the modulation frequency of the emitted light signal, a suitable phase difference relative to the phase of the emitted light signal, a suitable amplitude, a suitable waveform, etc.) to generate image signals (e.g., take measurements) indicative of the characteristics of reflected light signal 17. The TOF sensor may process (e.g., compare and correlate) the generated image signals across the multiple measurements to determine the phase difference and the TOF information.

The TOF sensor in FIG. 2 is merely illustrative. Illumination module 14 and sensor module 16 may each include any suitable circuitry (e.g., power supply circuitry, processing circuitry, control circuitry, readout circuitry, timing circuitry, clock circuitry, etc.). While illumination module 14 and sensor module 16 are shown as completely separate modules in FIG. 2 (and in FIG. 1), this is merely illustrative. If desired, illumination module 14 and sensor module 16 may be coupled to and include shared circuitry in the camera module system (e.g., power supply circuitry, modulation/demodulation circuitry, clock generation circuitry, a timing controller, signal generator circuitry, control circuitry, storage circuitry, etc.).

FIG. 3 is a diagram of an illustrative configuration for sensor module 16 (e.g., in FIGS. 1 and 2). As shown in FIG. 3, sensor module 16 may include a pixel array 20 containing sensor pixels 22 arranged in rows and columns and control and processing circuitry 24. Array 20 may contain, for example, tens, hundreds, or thousands of rows and columns of sensor pixels 22. Control circuitry 24 may be coupled to row control circuitry 26 or generally pixel control circuitry 26 (sometimes referred to as row driver circuitry or pixel driver circuitry) and column readout and control circuitry 28 or generally pixel readout circuitry 28 (sometimes referred to as column readout circuitry or column control circuitry, readout circuitry, or column decoder circuitry). Control circuitry 26 may receive (row) addresses from control circuitry 24 and supply corresponding (row) control signals such as reset, anti-blooming, row select (or pixel select), (de) modulation, storage, charge transfer, readout, sample-and-hold, and store control signals to pixels 22 over (row) control paths 30.

One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. Readout circuitry 28 may receive image signals (e.g., analog pixel values generated by pixels 22) over lines 32. Readout circuitry 28 may include memory circuitry for storing calibration signals (e.g., reset level signals, reference level signals) and/or image signals (e.g., image level signals) read out from array 20, amplifier circuitry or a multiplier circuit, analog to digital conversion (ADC) circuitry, bias circuitry, latch circuitry for selectively enabling or disabling the portions (columns) of readout circuitry 28, or other circuitry that is coupled to one or more pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Readout circuitry 28 may supply digital pixel data to control and processing circuitry 24 and/or processor 18 (FIG. 1) for pixels 22 (e.g., in one or more pixel columns) for further processing (e.g., digital signal processing).

If desired, pixel array 20 may also be provided with a filter array having multiple (color) filter elements (each corresponding to a respective pixel) which allows a single image sensor to sample light of different colors or sets of wavelengths. In general, filter elements of any desired color and/or wavelength (e.g., infrared wavelengths) and in any desired pattern may be formed over any desired number of image pixels 22. In the illustrative example of time-of-flight sensing using an illumination source (e.g., in illumination module 14 in FIGS. 1 and 2), pixel array 20 may be provided with a correspond filter array that passes light having colors and/or frequencies emitted from the illumination source.

Sensor module 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices technology. Image pixels 22 may be frontside illumination (FSI) image pixels or backside illumination (BSI) image pixels. If desired, array 20 may include pixels 22 of different types such as active pixels, optically shielded pixels, reference pixels, etc. If desired, sensor module 16 may include an integrated circuit package or other structure in which multiple integrated circuit substrate layers (e.g., from multiple wafers) or chips are vertically stacked with respect to each other.

Configurations in which a TOF sensor is configured to perform indirect TOF measurements based on a phase difference between an emitted light signal (e.g., emitted by an illumination module 14) and the reflected light signal from an object in an image scene (e.g., received by a sensor module) are described herein as illustrative examples. In these configurations, the TOF sensor may use each pixel in the array of pixels to gather multiple image signals associated with a corresponding set of image frames in order to perform an (indirect) TOF sensing operation. In particular, each pixel may generate image charge in response to incident reflected light signal at different relative phases (e.g., varying phase differences between the signal emitted by the light source and the sensor (de) modulation signal) and/or different frequencies (e.g., different light source modulation frequencies and sensor (de) modulation frequencies synchronized with the different light source modulation frequencies). The generated image charge for each pixel may be read out to construct the corresponding image frames associated with the different phases and/or different frequencies. Processing circuitry in the TOF sensor may subsequently process the image frames associated with the different phases and/or different frequencies to identify (e.g., generate) the TOF information such as object depth or distance information for the scene (e.g., based on the phase difference between the emitted light signal and the reflected light signal gathered by the sensor module).

To improve depth disambiguation, a TOF sensor may operate using two modulation frequencies f1 and f2 (e.g., frequencies associated with the light emitted by an illumination module, sensor (de) modulation frequencies associated with the how image charge is separated between two charge storage structures in each pixel in the pixel array of a sensor module, etc.) and may gather four (phase-varied) measurements for each of the two different frequencies f1 and f2 (e.g., using eight different measurements) for each TOF sensing operation. If desired, any suitable number of measurements (e.g., two measurements for each of the two frequencies f1 and f2, at least three measurements total between the two frequencies f1 and f2, etc.) may be used for each TOF sensing operation.

The sensor data gathered (e.g., read out) from the pixels may be subsequently processed. In particular, the gathered sensor data can benefit from noise filtering (sometimes referred to herein as denoising), which can increase the range or depth of the scene that the sensor is sensitive to and/or can reduce the power requirement of the light emitter in the illumination module.

By operating the TOF sensor using the two different frequencies, the TOF sensor may more efficiently perform depth disambiguation (e.g., improve the range or depth disambiguation of the scene). However, performing such a disambiguation requires a satisfactory signal-to-noise ratio (SNR). Accordingly, to meet the SNR requirement, the TOF sensor may be required to include large pixels or use extensive pixel binning, both of which may be undesirable given that the resolution of the TOF sensor is sacrificed for improved SNR. Similarly, while performing a denoise operation can improve SNR, this is typically done also at the expense of resolution.

To mitigate these issues, an imaging system may include a TOF sensor that performs a denoise operation on phase data using two different strengths (e.g., filters). FIG. 4 is a block diagram of an illustrative TOF camera having processing circuitry configured to perform a denoise operation on phase data using two different strengths (e.g., filters).

As shown in FIG. 4, sensor module 16 (e.g., implementing a portion of sensor module 12 or imaging system 10 in FIG. 1) may include sensor 42, which can include the elements of the sensor module 16 in FIG. 3 (e.g., an array of pixels, readout circuitry, control circuitry, etc.).

Sensor 42 may output pixel data corresponding to the charge gathered at pixels 22 which are subsequently readout and processed using readout circuitry 28.

In particular, as one illustrative example, each pixel 22 (FIG. 3) in a pixel array may include a photosensitive element and two charge storage structures. The pixel 22 may be modulated (e.g., receive a (de) modulation signal) such that the charge generated by the photosensitive element may be split between the two charge storage structures using the (de) modulation signal (e.g., having modulation frequency). In other words, a first portion of the charge is integrated and stored at the first charge storage structure and the remaining portion of the charge is integrated and stored at the second charge storage structure based on the (de) modulation signal. The integration and subsequent readout of this complementary set of two split charges may sometimes be referred to herein as a single measurement for a TOF sensing operation. Multiple such measurements may be made and read out to perform a single TOF sensing operation.

The sensor (de) modulation signal frequency may be synchronized with the emitted light signal modulation frequency, while the multiple measurements for the single TOF sensing operation may be made with phase offsets between the sensor (de) modulation signal and the modulated light source (illumination) signal. In some examples described herein as illustrative examples, four such measurements Q1, Q2, Q3, and Q4 (e.g., with varying phase offsets of 0 degrees, 90 degrees, 180 degrees, and 270 degrees between the illumination signal and the sensor (de) modulation signal) may be used to perform a single TOF sensing operation if a single modulation frequency is used.

A TOF sensor operating using two modulation frequencies f1 and f2 may gather four (phase-varied) measurements Q1, Q2, Q3, and Q4 for each of the two different frequencies f1 and f2 (e.g., using eight different measurements) for each TOF sensing operation. If desired, any suitable number of measurements (e.g., two measurements for each of the two frequencies f1 and f2, at least three measurements total between the two frequencies f1 and f2, etc.) may be used for each TOF sensing operation.

For each measurement, the difference between the two integrated charges respectively at the first and second charge storage structures in a pixel may be the output of the pixel. In other words, for a modulation frequency, and for a phase difference, each pixel may output a signal indicative of the difference between the charge integrated at the first charge storage structure and the charge integrated at the second charge storage structure. This difference signal may be referred to herein as the pixel output signal, which may subsequently be read out and processed by readout circuitry 28 in FIG. 3 to output corresponding digital pixel data. Accordingly, based on the above-mentioned example for a single TOF sensing operation using four measurements and two modulation frequencies, each pixel may output corresponding eight pixel signals respectively for phase difference of 0 degrees and modulation frequency f1 (measurement or signal Q1 for frequency f1), phase difference of 90 degrees and modulation frequency f1 (measurement or signal Q2 for frequency f1), phase difference of 180 degrees and modulation frequency f1 (measurement or signal Q3 for frequency f1), phase difference of 270 degrees and modulation frequency f1 (measurement or signal Q4 for frequency f1), phase difference of 0 degrees and modulation frequency f2 (measurement or signal Q1 for frequency f2), phase difference of 90 degrees and modulation frequency f2 (measurement or signal Q2 for frequency f2), phase difference of 180 degrees and modulation frequency f2 (measurement or signal Q3 for frequency f2), and phase difference of 270 degrees and modulation frequency f2 (measurement or signal Q4 for frequency f2). The phase difference referring to the phase difference between the emitted light signal and the sensor (de) modulation signal. This example of four measurements and two modulation frequencies is merely illustrative. In other configurations (e.g., using a different number of measurements Q based on different phase differences and modulation frequencies), each pixel may output a different set of pixel signal per TOF sensing operation (e.g., three total measurements for two modulation frequencies, fourth total measurements for two modulation frequencies, etc.).

Sensor 42 may output pixel data across the entire array associated with any suitable number of measurements to processing circuitry 40 for subsequent processing. Sensor module 16 may further include processing circuitry 40 such as digital signal processing circuitry that receives the pixel data output from sensor 42. Based on the output pixel data, processing circuitry 40 may perform subsequent (digital) processing on the output pixel data.

Processing circuitry 40 may include one or more integrated circuits (e.g., digital signal processing integrated circuits, image processing circuits, microprocessors, storage devices such as random-access memory and non-volatile memory, etc.) configured to perform digital signal processing functions. As one illustrative configuration, processing circuitry 40 may be a digital signal processor (DSP) implemented as (at least a portion of) processing circuitry 18 in FIG. 1 external to the camera module or sensor module. In other configurations, processing circuitry 40 may be implemented as part of the sensor module (e.g., may be implemented as processing circuitry 24 in FIG. 3) or be formed in any other suitable manner (e.g., as dedicated processor chip separate from the other processing circuitry in FIGS. 1 and 3).

In particular, processing circuitry 40 may include a phase calculation block 44, a phase denoise block 46, a depth disambiguation block 52, two depth calculation blocks 54 and 56, and a merge block 58. Each of these blocks in processing circuitry 40 may represent a functional circuitry block configured to perform the corresponding signal processing function. In other words, processing circuitry 40 may include dedicated computational blocks each performing one of the specified computational functions of blocks 44, 46, 52, 54, 56, and 58. Processing circuitry 40 may include corresponding memory circuitry for each computational block that assists in the computation or function of that computational block. Processing circuitry 40 including each of these functional blocks may be implemented on a single integrated circuit die or may be implemented on multiple integrated circuit dies. If desired, processing circuitry 40 and its corresponding functional blocks may be implemented in any other suitable manner (e.g., using one or more general-purpose processors).

Phase calculation block 44 (sometimes referred to herein as phase calculation circuitry 44) may be formed from a portion of digital signal processing circuitry or any other suitable circuitry configured to perform phase calculation functions or generally mathematical computation functions. In particular, phase calculation block 44 may process the sensor output data received from sensor 42 (e.g., associated with a suitable number of measurements from one or multiple modulation frequencies from pixels 22). Based on the sensor output data received from sensor 42, phase calculation block 44 may compute and output corresponding phase data.

In particular, for each modulation frequency, phase calculation block may generate a corresponding phase based on the measurement for that modulation frequency for each pixel. In particular, phase calculation block 44 may calculate differences between the in-phase components (e.g., pixel output data for phase difference of 180 degrees (Q3) subtracted by the pixel output data for phase difference of 0 degrees (Q1)), and pixel output data for phase difference of 270 degrees (Q4) subtracted by the pixel output data for phase difference of 90 degrees (Q2)). The phase calculation block 40 may further calculate the phase by calculating the arc tangent of the ratio (Q3-Q1)/(Q4-Q2). In other words, phase calculation block 40 may calculate the phase based on the following equation:

$$\text{Phase} = \arctan\left(\frac{(Q3 - Q1)}{(Q4 - Q2)}\right)$$

The resulting phase may be indicative of a distance (or a set of distances if there is depth ambiguity) of an object detected at a particular pixel. Performing this phase calculation across the entire pixel array results in a set of phase data mapping to pixel data gather at the array of pixels (e.g., phase data for each pixel).

In some illustrative configurations, phase calculation block 40 may also calculate the (average) amplitude and the (average) intensity of each measurement for each pixel in addition to the phase. As an example, phase calculation block 40 may calculate the amplitude and the intensity based on the following equations:

$$\text{Aplitude} = \frac{1}{2}\sqrt{(Q1 - Q3)^2 + (Q2 - Q4)^2}$$

$$\text{Intensity} = \frac{1}{4}(Q1 + Q2 + Q3 + Q4)$$

Performing these amplitude and intensity calculations across the entire pixel array results in a set of amplitude data and a set of intensity data mapping to pixel data gather at the array of pixels (e.g., amplitude data and intensity data for each pixel).

Each of these sets of (phase, amplitude, and intensity) data may be output from phase calculation block 44 sequentially and/or in parallel. Subsequent processing such as denoising may be performed on each of these three different sets of data (e.g., three different channels). If desired, some of the function of phase calculation block 44 (e.g., the subtraction between signals Q3 and Q1 and between signals Q4 and Q2) may be performed in the analog domain and/or at the pixel level.

Phase denoise block 46 may receive the set of phase data and perform denoise operation (e.g., filtering operation on the set of phase data). If desired, one or more correction operations (e.g., ambient light correction, aliasing correction, etc.) may be performed on the set of phase data prior to the denoise or filtering operation.

Phase denoise block 46 (sometimes referred to herein as phase calculation circuitry 46) may be formed from a portion of digital signal processing circuitry or any other suitable circuitry configured to perform filtering functions or generally mathematical computation functions. In particular, phase denoise block 46 may process the set of output phase data received from phase calculation block 44 (e.g., phase data associated with each pixel 22 in the pixel array). Based on the received phase data, phase calculation block 44 may filter the phase data to remove noise in the phase data.

To preserve the resolution of the phase data while improving SNR, phase calculation block 44 may be configured to filter the same phase data based on two different types of filters (e.g., two filters with varying properties or strengths) thereby generating two denoised data streams. As shown in FIG. 4, phase calculation block 44 may output a first set of denoised phase data along path 48 and a second set of denoised phase data along path 50.

The first set of denoised phase data (sometimes referred to herein as high-fidelity denoise output data) may be optimized for performing depth calculation (e.g., at block 56), while the second set of denoised phase data (sometimes referred to herein as low-fidelity denoise output data) may be optimized for performing depth disambiguation (e.g., at block 52). The second set of denoised phase data may also be used for depth calculation (e.g., at block 42), the results of which may be merged (e.g., at block 58) with the depths calculated at block 56. To perform the differing types of denoise or filtering operations, phase denoise block 46 may include two or more sets of processing circuits configured to denoise the phase data based on different filters or a set of shared processing circuits configurable to perform processing based on multiple types of filters and/or modes.

FIGS. 5A-5C show three different illustrative types of filters that phase denoise block 46 may be configured to implement (e.g., in performing the phase data denoise functions to generate the high- and low-fidelity denoised phase data).

In particular, phase denoise block 46 may perform a bilateral denoise (filter) operation on the phase data for each pixel by taking into account the phase data for pixels adjacent to or neighboring that pixel. In particular, performing the bilateral denoise operation allows exclusion of phase data from neighboring pixels that do not belong to the same region (or object) in the scene (e.g., invalid pixels). Different filtering weights may be applied to phase data from different neighboring pixels. Illustrative position-dependent filtering weights are shown in matrix form in FIG. 5A-5C.

In the examples of FIGS. 5A-5C, the value at each position in the matrix refers to the weight applied to the phase data of the pixel in that position, with the relative position from the matrix center being the relative position to the center pixel to which the filter is being applied. The average of the weighted phase data may be the denoised phase data for the center pixel (e.g., an output of phase denoise block 46).

FIG. 5A shows a small 3-by-3 weights matrix 60 that, when applied as a bilateral filter, weighs the data from the center pixel by a value of 4, weighs the data from pixels vertically and horizontally adjacent to the center pixel by a value of 2, and weighs the data from pixels diagonally adjacent to the center pixel by a value of 1.

FIG. 5B shows a large 5-by-5 weights matrix 70 that, when applied as a bilateral filter, weighs all data within a distance of two (e.g., vertically, horizontally, and diagonally) from the center pixel by a value of 1.

In some suitable arrangements, phase denoise block 46 may implement the bilateral filters using finite impulse response filters with the weight matrices in FIGS. 5A and 5B. If desired, phase denoise block 46 may implement the bilateral filters using infinite impulse response filters. As an example, FIG. 5C shows a wide 5-by-3 weights matrix 80 useable with an infinite impulse filter.

In particular, the matrix weights in FIG. 5C, when applied as an infinite impulse response filter, may weigh all phase data for the five pixels in the top row (which includes feedback data from the previous filter output) by a value of 3 and the remaining phase data by a value of 1. The use of the wide infinite impulse response filter (e.g., associated with FIG. 5B) instead of the large finite impulse response filter (e.g., associated with FIG. 5C) helps reduce the amount of memory required for line buffers.

By applying the bilateral filter, the denoise operation averages all of the valid and similar neighboring pixel phase data (compared to the center pixel phase data) that are within a denoise threshold value and weights them spatially based on the weights in the weight matrix being used. Saturated phase data from saturated pixel may be replaced by any suitable value such that amplitude channel data is zero so that these pixel values will not contribute to the filtered average value.

As an example, to generate the high-fidelity denoised phase data along high-fidelity path 48 in FIG. 4, phase denoise block 46 may apply a relatively small filter having relatively small filter strength (e.g., using data from fewer pixels, using a relatively large weight for a center pixel, etc.). In one suitable arrangement, a 3-by-3 weight matrix such as matrix 60 in FIG. 5A may be used to generate the high-fidelity denoised phase data. As another example, to generate the low-fidelity denoised phase data along low-fidelity path 50 in FIG. 4, phase denoise block 46 may apply a relatively large (or wide) filter having relatively larger filter strength (e.g., using data from more pixels, using a relatively small weight for the center pixel, etc.). In one suitable arrangement, a 5-by-5 weight matrix such as matrix 70 in FIG. 5B (or a 5×3 weight matrix for an infinite impulse response filter such as matrix 80 in FIG. 5C) may be used to generate the low-fidelity denoised phase data.

The illustrative types of bilateral filters as shown in and described in connection with FIGS. 5A-5C are merely illustrative. If desired, different weights or different shapes of matrices may be used by phase denoise block 46. In general, phase denoise block 46 may apply a small or bypass filter to generate the high-fidelity denoised phase data which can preserve small textures, while applying a larger or wider filter to generate the low-fidelity denoised phase data which adapts to rough objects/distances for phase/distance disambiguation, thereby utilizing the advantages of both types of filtering.

Figures 6A, 6B:
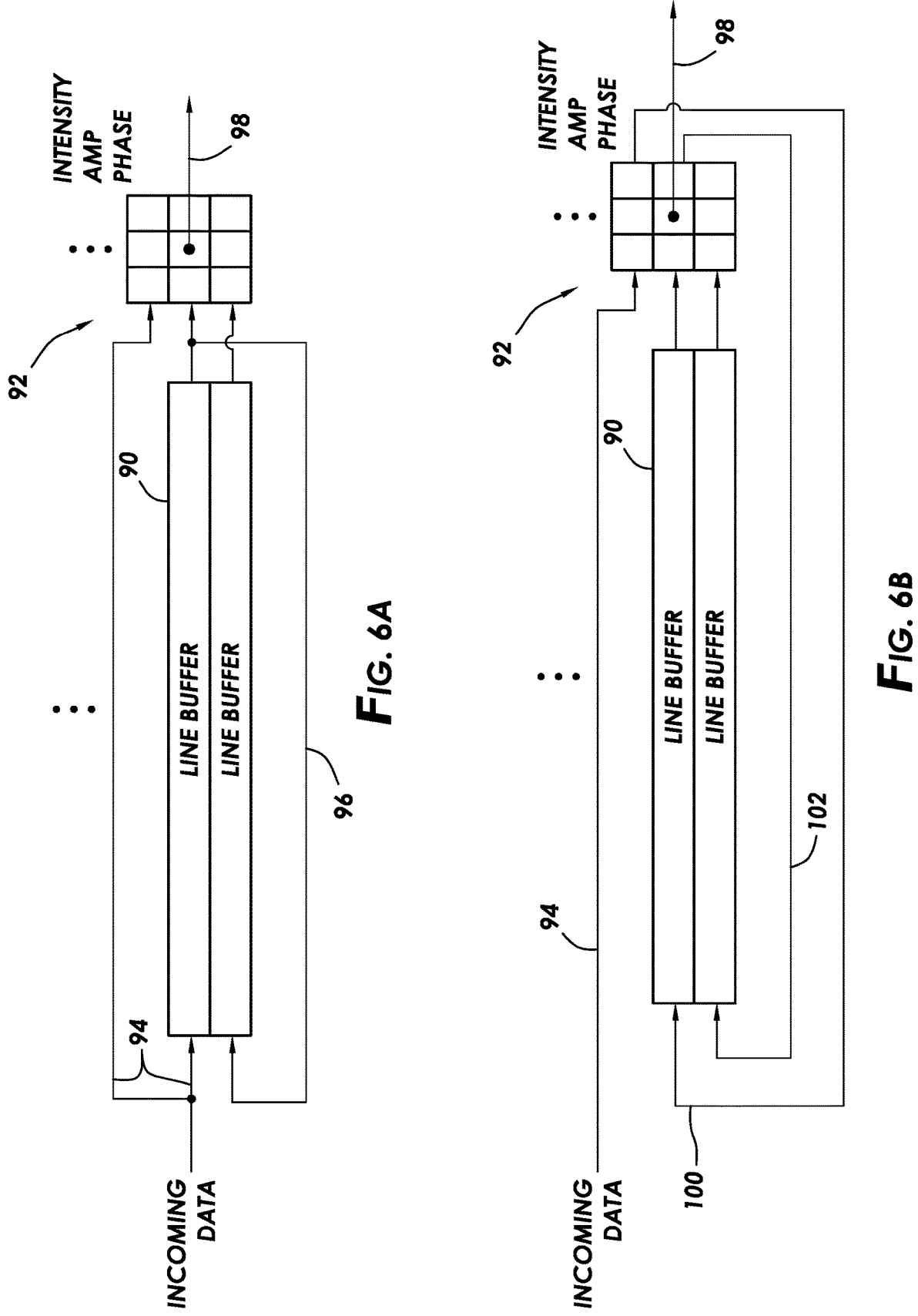
FIGS. 6A and 6B are diagrams of illustrative modes for performing bilateral filtering in accordance with some embodiments.

FIGS. 6A and 6B show two different illustrative configurations for denoise block 46 (e.g., in performing the phase denoise functions to generate the high- and low-fidelity denoised phase data).

In particular, FIG. 6A shows an illustrative configuration in which denoise block 46 implements a finite impulse response filter (e.g., using weight matrices in FIGS. 5A and/or 5B) as a first mode. In the example of FIG. 6A, denoise block 46 may include line buffer circuitry 90 (or other memory circuitry) and computational circuitry 92 (e.g., performing weighing (multiplying) and averaging functions). As shown in FIG. 6A, incoming data may be provided to both the first row of computational circuitry 92 and the beginning of the first line buffer. The end of the first line buffer may provide input to the second row of the computational circuitry 92, while also providing data to the beginning of the second line buffer. The end of the second line buffer may provide input to the third row of the computation circuitry 92. Based on the input data, computational circuitry 92 may output a weighted average output data at output 98 for the center pixel.

In this finite impulse response filter configuration, the output of denoise block 46 (e.g., the denoised data) does not impact the line buffer content, which ensures symmetrical operation.

FIG. 6B shows an illustrative configuration in which denoise block 46 implements an infinite impulse response filter (e.g., using weight matrices in FIG. 5C) as a second mode. In the example of FIG. 6B, denoise block 46 may similarly include line buffer circuitry 90 (or other memory circuitry) and computational circuitry 92 (e.g., performing weighing (multiplying) and averaging functions). As shown in FIG. 6B, incoming data may be provided to the first row of computational circuitry 92. The output associated with the first row of computational circuitry 92 may provide input data to the beginning of the first line buffer via path 100. The end of the first line buffer may provide input to the second row of computation circuitry 92. The output associated with the second row of computational circuitry 92 may provide input data to the beginning of the second line buffer via path 102. The end of the second line buffer may provide input to the third row of computation circuitry 92. Based on the input data, computational circuitry 92 may output a weighted average output data at output 98 for the center pixel.

In this infinite impulse response filter configuration, the output of denoise block 46 (e.g., the denoised data) is written back to the line buffer content, which increases the filtering strength. The region of filtering in this type of configuration may not be well defined.

As illustrated in both FIGS. 6A and 6B, filtering may be applied to data across multiple channels (e.g., to phase data as described above, to amplitude data, to intensity data, etc.) and corresponding circuitry for multiple channels may be included in denoise block 46. The different channels may refer to different representations of the same collected pixel data such as phase data associated with a polar angle of pixel data in polar coordinate representation, amplitude data associated with the radial distance of pixel data in a polar coordinate representation, etc.

The configurations shown to implement denoise block 46 in FIGS. 6A and 6B are merely illustrative. If desired, different feedback paths and input-output connections may be used as suitable to implement the desired type of filter (e.g., whether infinite impulse response or finite impulse response, with different weights, taking data from a different number of pixels, etc.).

Referring back to FIG. 4, phase denoise block 46 may provide low-fidelity denoised output data along path 50 to depth disambiguation block 52 and depth calculation block 54.

Depth disambiguation block 52 (sometimes referred to herein as depth disambiguation circuitry 52) may be formed from a portion of digital signal processing circuitry or any other suitable circuitry configured to perform mathematical computation functions. In particular, depth disambiguation block 52 may receive two different set of phase data each corresponding a different modulation frequency. Based on the two different sets of phase data, depth disambiguation block 52 may disambiguate between multiple possible ranges of depths to arrive a particular range of depths. This process and the corresponding circuitry block may sometimes be referred to herein as phase unwrapping or a phase unwrap block.

If desired, sensor and processing systems utilizing more than two frequencies or other configurations for capturing phase data may also be used for depth disambiguation. The embodiments described herein (e.g., utilizing both high-fidelity and low-fidelity denoised output data streams) may similarly be applied to these systems. While the algorithms for these systems may different based on the different sets of phase data gathered, depth disambiguation still requires high SNR data and may be performed on the low-fidelity denoised output data stream generated in these systems (while a high-fidelity denoised output data stream is also generated for the same data).

Both the high-fidelity and low-fidelity denoised phase data may be used to for depth calculation (e.g., generate a single final depth map).

In particular, depth calculation blocks 54 and 56 (sometimes referred to herein as depth calculation circuitry 54 and 56) may be formed from portions of digital signal processing circuitry or any other suitable circuitry configured to perform mathematical computation functions. In particular, depth calculation block 54 may perform depth calculation on the low-fidelity denoised phase data to generate corresponding depth data (e.g., depth data from each of the pixels cumulatively forming a first depth map), while depth calculation block 56 may perform depth calculation on the high-fidelity denoised phase data to generate depth data (e.g., depth data from each of the pixels cumulatively forming a second depth map). The two depth calculation block may be implemented separately (e.g., form parallel processing paths) or may use shared circuitry (e.g., may be operated in a time-multiplexed manner).

At merge block 58, depth data from the two depth calculation blocks 54 and 56 may be merged to form a final set of depth data (e.g., a final depth map). Merge block 58 (sometimes referred to herein as data merging block or circuitry 58) may be formed from a portion of digital signal processing circuitry or any other suitable circuitry configured to perform multiplexing and/or averaging or generally mathematical computation functions. In particular, the high-fidelity denoised data helps preserve small details and textures, while the low-fidelity denoise data helps adapt to rough object shapes. The merging of the depth data based on both of these types of denoise data may help optimize different portions of the final depth map.

Performing phase data denoising requires averaging phase data from multiple pixels (e.g., based on weights as described in connection with FIGS. 5A-5C). However, simply taking the numerical sum of phases gathered by multiple pixels can lead to inaccurate results as the phase data is only a portion of the pixel data gathered and does not account for other data channels (e.g., amplitude data). As an example, in a polar coordinate representation, the polar angle is indicative of the phase data and the radius is indicative of amplitude data. Accordingly, even if phases are unwrapped, merely taking averages of the polar angle without consideration of the radius leads to inaccurate results. While pixel data may be more intuitively represented in polar coordinates, taking phase data averages across different pixels in polar coordinates may be difficult. Accordingly, at least a portion of the denoise operation may be performed in Cartesian coordinate (components) representation of the phase data.

Figure 7:
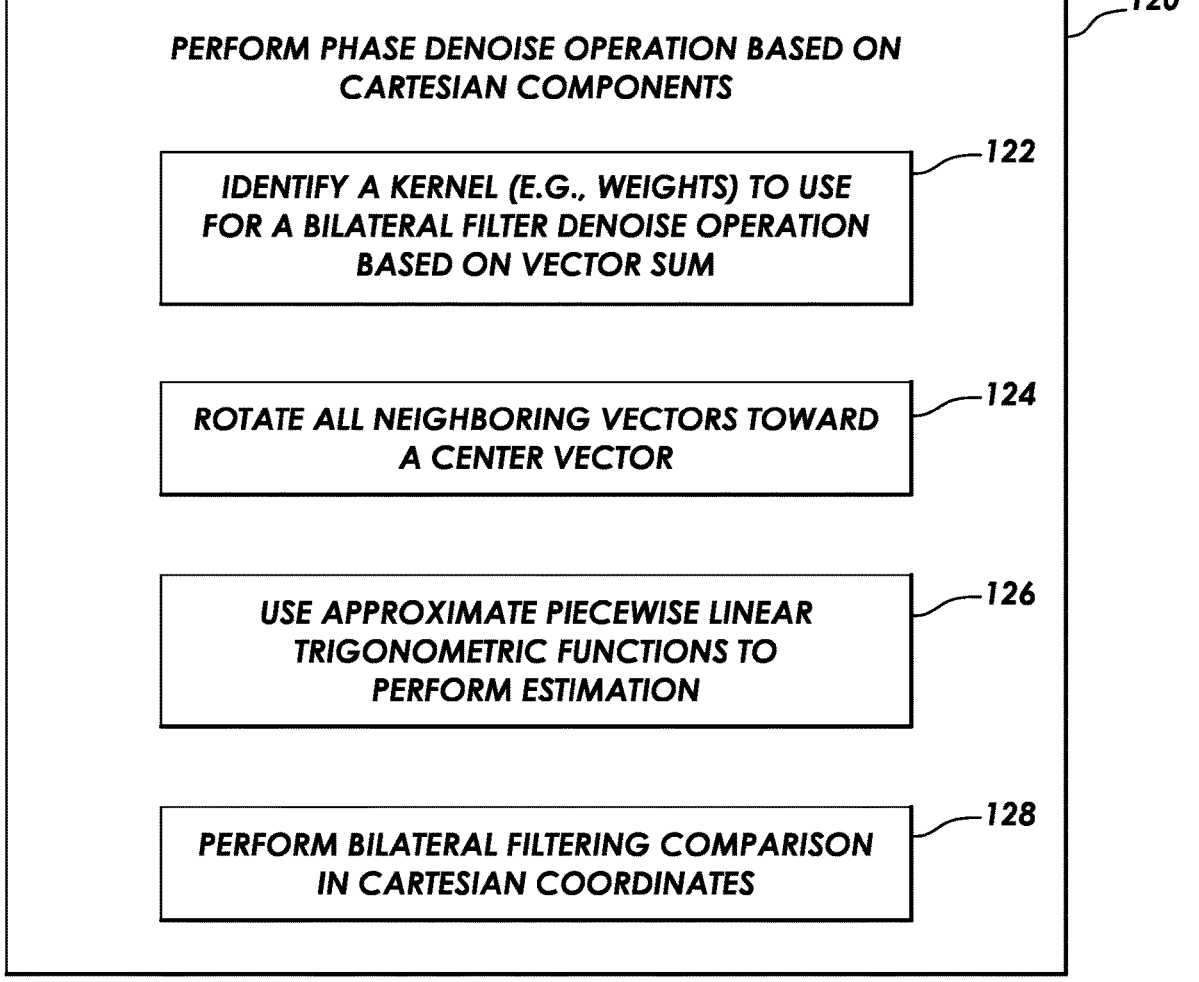
FIG. 7 is a flowchart of illustrative operations for performing phase denoise based on Cartesian components in accordance with some embodiments.

FIG. 7 is a flowchart of illustrative operations performed by phase denoise block 46 to perform phase data denoise based on the use of Cartesian coordinate (components) representation. In other words, phase denoise circuitry 46 perform operations 120 when performing phase data denoise operations (e.g., to generate one or both output data streams based on different filters as described in connection with FIG. 4) based on Cartesian components associated with the phase data.

At operation 122, the phase denoise circuitry may identify a kernel (e.g., a set of weights as represented by a matrix such as one of the matrices in FIGS. 5A-5C). This kernel may be used to perform a bilateral filter denoise operation. As described above, the bilateral filter operation may include performing an average of vectors instead of phases (e.g., polar angles). As examples, the x-component (sx) and the y-component (sy) of the vector sum of the pixel data from all pixels in the kernel (e.g., a center pixel and neighboring pixels) may be represented by the following two equations (in a Cartesian coordinate representation):

$$sx = \frac{1}{N}\sum_i A_i \cdot \cos(\varphi_i)$$

$$sy = \frac{1}{N}\sum_i A_i \cdot \sin(\varphi_i)$$

where, N is the number of pixels, $A_i$ is the amplitude of the 'i'th pixel, and $\varphi_i$ is the phase of the 'i'th pixel. The two equations above (and consequently the subsequent equations utilizing the above equations) illustrate an example where kernel weights are all 1 in order to not unnecessarily obscure the embodiments described herein. If desired, the filtering weights may be incorporated into the vector sum (e.g., one or more weights that are not 1).

The resulting averaged phase ($\varphi$) and amplitude (A) may be presented by the following two equations (in a polar coordinate representation):

$$\varphi = \text{atan}\left(\frac{sy}{sx}\right)$$

$$A = \sqrt{sx^2 + sy^2}$$

At operation 124, the phase denoise circuitry may rotate the pixel data for all pixels relative to pixel data for the center pixel (e.g., rotation by the phase of the center pixel), and the resulting, x- and y-components of the vector sum, the resulting phase and amplitude may be represented by the following four equations:

$$sx = \sum_i A_i \cdot \cos(\varphi_i - \varphi_C)$$

$$sy = \sum_i A_i \cdot \sin(\varphi_i - \varphi_C)$$

$$\varphi = \varphi_C + \text{atan}\left(\frac{sy}{sx}\right)$$

$$A = \frac{1}{N}\sqrt{sx^2 + sy^2}$$

where, $\varphi_C$ is the phase of the center pixel.

At operation 126, the phase denoise circuitry may estimate the values of the above trigonometric equations using approximate piecewise linear trigonometric functions (e.g., for sine and cosine functions).

As examples, the resulting approximations may be:

$$sx = \frac{1}{N}\sum_i A_i \cdot c(\varphi_i - \varphi_C)$$

$$sy = \frac{1}{N}\sum_i A_i \cdot s(\varphi_i - \varphi_C)$$

$$A \approx (|sx| + |sy|)$$

$$\varphi \approx \varphi_C + \text{sgn}(sy) \cdot \left(\frac{A - sx}{A}\right)\bigg/4$$

where, $c(\varphi_i\text{-}\varphi_c)$ is an approximate function (e.g., a piecewise linear function) for cos $(\varphi_i\text{-}\varphi_c)$, and $s(\varphi_i\text{-}\varphi_c)$ is an approximate function (e.g., a piecewise linear function) for sin $(\varphi_i\text{-}\varphi_c)$. In one illustrative configuration described herein as an example, the approximate functions satisfy the following two properties: $\forall x$: $|c(x)|+|s(x)|=1$ and $r(x, y)=|c(x)|+|s(y)|$.

In some illustrative configurations described herein as examples, approximate piecewise linear function c (x) approximating function cos (x) and approximate piecewise linear function s (x) approximating sin (x) may be defined as the two equations below:

$$c(x) = \begin{cases} -\frac{2}{\pi}x + 1, & 0 \le x < \pi \\ \frac{2}{\pi}x - 3, & \pi \le x < 2\pi \\ -\frac{2}{\pi}x + 5, & 2\pi \le x < 3\pi \\ \frac{2}{\pi}x - 7, & 3\pi \le x < 4\pi \\ \vdots & \end{cases}$$

$$s(x) = \begin{cases} \frac{2}{\pi}x, & \frac{-\pi}{2} \le x < \frac{\pi}{2} \\ -\frac{2}{\pi}x + 2, & \frac{\pi}{2} \le x < \frac{3\pi}{2} \\ \frac{2}{\pi}x - 4, & \frac{3\pi}{2} \le x < \frac{5\pi}{2} \\ -\frac{2}{\pi}x + 6, & \frac{5\pi}{2} \le x < \frac{7\pi}{2} \\ \vdots & \end{cases}$$

These approximate piecewise linear functions are merely illustrative. If desired, more accurate approximate functions for trigonometric functions may be used instead.

At operation 128, the phase denoise circuitry may perform bilateral filtering comparison based on the cartesian coordinate representation (e.g., using x- and y-components of vectors). In particular, the following equations may be used for calculating the validity of pixel data for each pixel (e.g., whether the pixel data is valid to include in the average):

$$nx = A_i \cdot c(\varphi_i - \varphi_c)$$

$$ny = A_i \cdot s(\varphi_i - \varphi_c)$$

If the following comparison equation is satisfied, the (valid) data is included in the average/sum; otherwise, the invalid data is excluded:

$$(nx - A_C)^2 + ny^2 < \text{denoise\_}k \cdot \sigma(I)$$

where, $A_C$ is the amplitude of the center pixel, and denoise_k·σ(I) is or is indicative of a denoise threshold value.

If desired, the following approximation for the comparison operation may be used instead to determine valid/invalid data for averaging:

$$|nx-A_C|+|ny|<\text{denoise\_k·σ}(I)$$

For small angles, the above approximation may be accurate, which provides accurate filtering in good SNR conditions. In the illustrative example where rotations were first performed relative to the center pixel data (e.g., at operation 124), the angles are small on the same objects or region. In poor SNR conditions, denoise_k·σ(I) can be very wide but the inaccuracy does not impact the quality significantly.

In one illustrative example, imaging system 10 in FIG. 1, camera module 12 in FIG. 1, sensor module 16 in FIG. 1, or processing circuitry 40 in FIG. 4 implementing one or more of the features described in connection with FIGS. 5-7 may be incorporated into a vehicle system such as in vehicle 150 in FIG. 8. In particular, a vehicular system performing depth disambiguation by processing circuitry in the vehicular system (e.g., implementing processing circuitry 40 in FIG. 4 as described herein using the low-fidelity denoised data stream) may be particularly beneficial given that in some vehicular applications, each object may typically cover large regions of pixels and denoise strength can be higher (e.g., in generating the low-fidelity denoised data stream). The processing circuitry in the vehicular system may perform one or more of the denoise, depth disambiguation, depth calculation, and merge operations as described herein, along with any other suitable operations as described herein for suitable vehicular applications.

As shown in the example of FIG. 8, vehicle 150 may include one or more imaging systems 10 (e.g., containing the features or functions of processing circuitry 40 described herein). The imaging systems may form part of a vehicular safety system or other vehicular system. Imaging systems 10 may be imaging systems with dedicated image capture and/or image processing functions. If desired, an imaging system 10 may perform some or all of the image processing functions associated with a given driver assist operation. A dedicated driver assist processor may receive signals from imaging systems 10.

In another suitable example, an imaging system 10 may perform only some or none of the image processing operations associated with a given driver assist function. For example, an imaging system 10 may merely capture images of the environment surrounding the vehicle 150 and transmit the image data to other dedicated and/or central processing circuitry for further processing. Such an arrangement may be used for vehicle safety system functions that require large amounts of processing power and memory (e.g., full-frame buffering and processing of captured images).

In the illustrative example of FIG. 8, a first imaging system 10 is shown mounted on the front of car 150 (e.g., to capture images of the surroundings in front of the car), and a second imaging system 10 is shown mounted in the interior of car 150 (e.g., to capture images of the driver of the vehicle). If desired, an imaging system 10 may be mounted at the rear end of vehicle 150 (i.e., the end of the vehicle opposite the location at which first imaging system 10 is mounted in FIG. 8). The imaging system at the rear end of the vehicle may capture images of the surroundings behind the vehicle. These examples are merely illustrative. One or more imaging systems 10 may be mounted on (e.g., on the exterior of and/or within) a vehicle 150 at any desired location(s).

Configurations in which one or more imaging systems containing processing circuitry 40 described herein are placed with respect to a vehicle to assist in vehicular operation as described in connection with FIG. 8 are merely illustrative.

Various embodiments have been described illustrating systems and methods for indirect time-of-flight (TOF) sensing (e.g., performing phase denoise operations).

As an example, a sensor module may be configured to perform time-of-flight sensing. The sensor module may include an array of sensor pixels configured to generate pixel data indicative of phase data for a time-of-flight sensing operation. The sensor module may further include signal processing circuitry having phase denoise circuitry configured to perform a first filtering operation on the phase data using a first filter of a first type to generate first denoised phase data and to perform a second filtering operation on the phase data using a second filter of a second type to generate second denoised phase data.

The signal processing circuitry may include depth disambiguation circuitry configured to receive the first denoised phase data and depth calculation circuitry configured to receive the second denoised phase data. The depth calculation circuitry may be configured to generate first depth data based on the first denoised phase data and to generate second depth data based on the second denoised phase data. The signal processing circuitry may be configured to merge the first and second depth data to generate a depth map for the time-of-flight sensing operation.

As another example, a signal processor may be configured to receive time-of-flight sensing data associated with an array of pixels. The signal processor may include phase calculation circuitry configured to receive the time-of-flight sensing data and to generate corresponding phase data based on the time-of-flight sensing data. The signal processor may further include phase denoise circuitry configured to receive the phase data, to generate first denoised phase data by applying a first filter to the phase data, and to generate second denoised phase data by applying a second filter to the phase data. The signal processor may further include depth disambiguation circuitry configured to receive the first denoised phase data and to perform a depth disambiguation operation based on the first denoised phase data. The signal processor may further include depth calculation circuitry configured to receive the second denoised phase data and to perform a depth calculation operation based on the second denoised phase data.

As yet another example, a sensor module may be configured to perform time-of-flight sensing. The sensor module may include an array of sensor pixels configured to generate pixel data indicative of phase data for a time-of-flight sensing operation. The sensor module may include phase denoise circuitry configured to perform a bilateral filtering operation on phase data from a center pixel using phase data from neighboring pixels to generate denoised phase data by determining a vector sum of pixel data from the center pixel and from the neighboring pixels and by rotating vectors associated with the pixel data from the neighboring pixels relative to a vector associated with the pixel data from the center pixel.

The foregoing is merely illustrative of the principles of this invention and various modifications can be made by those skilled in the art without departing from the scope and spirit of the invention. The foregoing embodiments may be implemented individually or in any combination.

What is claimed is:

1. A sensor module configured to perform time-of-flight sensing comprising:

an array of sensor pixels configured to generate pixel data indicative of phase data for a time-of-flight sensing operation; and signal processing circuitry having phase denoise circuitry configured to perform a first filtering operation on the phase data using a first filter of a first type to generate first denoised phase data and to perform a second filtering operation on the phase data using a second filter of a second type to generate second denoised phase data, wherein the first and second filters each use phase data from multiple sensor pixels.

2. The sensor module defined in claim 1, wherein the signal processing circuitry comprises depth disambiguation circuitry configured to receive the second denoised phase data and depth calculation circuitry configured to receive the first denoised phase data.

3. The sensor module defined in claim 2, wherein the depth calculation circuitry is configured to generate first depth data based on the first denoised phase data and to generate second depth data based on the second denoised phase data.

4. The sensor module defined in claim 3, wherein the signal processing circuitry is configured to merge the first and second depth data to generate a depth map for the time-of-flight sensing operation.

5. The sensor module defined in claim 1, wherein the first filter and the second filter differ in filter strength.

6. The sensor module defined in claim 5, wherein the first filter is a bilateral filter and the second filter is a bilateral filter.

7. The sensor module defined in claim 5, wherein the second filter uses phase data from a first number of sensor pixels and the first filter uses phase data from a second number of sensor pixels that is less than the first number of sensor pixels.

8. The sensor module defined in claim 5, wherein the second filter implements an infinite impulse response filter and the first filter implements a finite impulse response filter.

9. A signal processor configured to receive time-of-flight sensing data associated with an array of pixels, the signal processor comprising:

phase calculation circuitry configured to receive the time-of-flight sensing data and to generate corresponding phase data based on the time-of-flight sensing data;

phase denoise circuitry configured to receive the phase data, to generate first denoised phase data by applying a first filter to the phase data, and to generate second denoised phase data by applying a second filter to the phase data;

depth disambiguation circuitry configured to receive the first denoised phase data and to perform a depth dis-ambiguation operation based on the first denoised phase data; and depth calculation circuitry configured to receive the sec-ond denoised phase data and to perform a depth cal-culation operation based on the second denoised phase data.

10. The signal processor defined in claim 9, further comprising:

additional depth calculation circuitry configured to receive the first denoised phase data and to perform an additional depth calculation operation based on the first denoised phase data.

11. The signal processor defined in claim 10, further comprising:

data merging circuitry configured to merge first depth data from the depth calculation operation based on the second denoised phase data with second depth data from the additional depth calculation operation based on the first denoised phase data.

12. The signal processor defined in claim 9, wherein the first filter is a bilateral filter and the second filter is a bilateral filter, and wherein each filtering operation using the first filter is based on phase data from a first number of pixels and each filtering operation using the second filter is based on phase data from a second number of pixels less than the first number of pixels.

13. The signal processor defined in claim 9, wherein the signal processor is configured to be implemented as a portion of a vehicular system.

14. A sensor module configured to perform time-of-flight sensing comprising:

an array of sensor pixels configured to generate pixel data indicative of phase data for a time-of-flight sensing operation; and phase denoise circuitry configured to perform a bilateral filtering operation on phase data from a center pixel using phase data from neighboring pixels to generate denoised phase data by:

determining a vector sum of pixel data from the center pixel and from the neighboring pixels; and rotating vectors associated with the pixel data from the neighboring pixels relative to a vector associated with the pixel data from the center pixel.

15. The sensor module defined in claim 14, wherein the phase denoise circuitry is configured to perform a bilateral filtering operation further by approximating trigonometric functions using a set of linear functions.

16. The sensor module defined in claim 15, wherein determining the vector sum comprises using the set of linear functions to approximate trigonometric functions.

17. The sensor module defined in claim 16, wherein the phase denoise circuitry is configured to perform the bilateral filtering operation further by determining the denoised phase data based on the vector sum.

18. The sensor module defined in claim 17, wherein determining the denoised phase data based on the vector sum comprises using the set of linear functions to approxi-mate trigonometric functions.

19. The sensor module defined in claim 15, wherein the phase denoise circuitry is configured to perform the bilateral filtering operation further by performing a bilateral filtering comparison operation to determine valid pixel data for the vector sum.

20. The sensor module defined in claim 19, wherein performing the bilateral filtering comparison operation com-prises performing a comparison using components of vec-tors associated with the pixel data.

* * * * *